(12) United States Patent
Mei et al.

(10) Patent No.: US 9,718,512 B2
(45) Date of Patent: Aug. 1, 2017

(54) FOLDABLE SCOOTER AND METHOD OF FOLDING SAME

(71) Applicants: Chengzhai Mei, Shenzhen (CN); Chenglong Mei, Shenzhen (CN)

(72) Inventors: Chengzhai Mei, Shenzhen (CN); Chenglong Mei, Shenzhen (CN)

( * ) Notice: Subject to any disclaimer, the term of this patent is extended or adjusted under 35 U.S.C. 154(b) by 0 days.

(21) Appl. No.: 15/049,138

(22) Filed: Feb. 21, 2016

(65) Prior Publication Data
US 2017/0073032 A1 Mar. 16, 2017

(30) Foreign Application Priority Data

Sep. 14, 2015 (CN) ...................... 2015 2 0710681 U
Nov. 6, 2015 (CN) ...................... 2015 2 0884014 U

(51) Int. Cl.
| | |
|---|---|
| *B62K 15/00* | (2006.01) |
| *B62K 3/00* | (2006.01) |
| *B62K 21/02* | (2006.01) |
| *B62K 21/12* | (2006.01) |
| *B62J 25/00* | (2006.01) |
| *B62K 11/02* | (2006.01) |

(52) U.S. Cl.
CPC ............. *B62K 15/008* (2013.01); *B62J 25/00* (2013.01); *B62K 3/002* (2013.01); *B62K 11/02* (2013.01); *B62K 21/02* (2013.01); *B62K 21/12* (2013.01); *B62K 2202/00* (2013.01); *B62K 2700/34* (2013.01); *B62K 2700/56* (2013.01)

(58) Field of Classification Search
CPC ...... B62K 15/008; B62K 3/002; B62K 11/02; B62K 21/02; B62K 21/12; B62K 2202/00; B62K 2700/34; B62J 25/00
See application file for complete search history.

(56) References Cited

U.S. PATENT DOCUMENTS

| | | | | |
|---|---|---|---|---|
| 6,012,539 | A * | 1/2000 | Patmont ................. | B62D 63/00 180/208 |
| 8,801,009 | B2 * | 8/2014 | Sapir ...................... | B62K 3/002 280/87.05 |
| 2012/0018968 | A1 * | 1/2012 | Joslin ..................... | B62K 3/002 280/87.041 |
| 2015/0266536 | A1 * | 9/2015 | Yap ........................ | B62K 3/002 180/181 |
| 2017/0066496 | A1 * | 3/2017 | Ochner .................. | B62K 3/002 |

* cited by examiner

*Primary Examiner* — Kevin Hurley
*Assistant Examiner* — Marlon A Arce
(74) *Attorney, Agent, or Firm* — Cheng-Ju Chiang

(57) ABSTRACT

A foldable scooter is provided, including: a supporting base being capable of carrying goods; a front wheel assembly hinged to a front end of the supporting base via a front rotation assembly, comprising a front fork and a front wheel pivoted to the front fork; a rear wheel assembly provided hinged to a rear end of the supporting base via a rear rotation assembly, and comprising a rear fork and a rear wheel pivoted to the rear fork; a steering bar located at a top end of the front wheel assembly; and a handlebar is fixed at a top end of the steering bar. The front wheel assembly and the rear wheel assembly are capable of rotating and then flipping to be folded onto a top surface of the supporting base.

18 Claims, 7 Drawing Sheets

FOLDABLE SCOOTER AND METHOD OF FOLDING SAME

FIELD OF THE INVENTION

The present invention relates to a scooter, and particularly, to a foldable scooter capable of transporting goods.

DESCRIPTION OF RELATED ART

Nowadays there are various transport vehicles in our life. Scooters are such transports also for entertainments and sports. They are very convenient and quick transport vehicles, specifically within a not far distance. However, the existing scooters cannot be used for transporting goods and cargoes, and have a lager volume which is not convenient to be placed or dragged when they are not used.

SUMMARY OF THE INVENTION

In order to overcome the above mentioned shortcoming, a main objective of the present invention is to supply a foldable scooter capable of transporting cargo or goods, which can be folded into a small volume for being conveniently placed.

For obtain the above object, a foldable scooter provided in accordance with the embodiments, comprises: a supporting base with a top surface and an opposite back, being capable of carrying goods on the top surface; a front wheel assembly hinged to a front end of the supporting base via a front rotation assembly, comprising a front fork and a front wheel pivoted to the front fork; a rear wheel assembly provided hinged to a rear end of the supporting base via a rear rotation assembly, and comprising a rear fork and a rear wheel pivoted to the rear fork; a steering bar located at a top end of the front wheel assembly; and a handlebar fixed at a top end of the steering bar. The foldable scooter further comprises a front rotation assembly and a rear rotation assembly; the front wheel assembly is capable of rotating and then flipping backwards to be folded onto the top surface of the supporting base in a minimum dimension via the front rotation assembly; and the rear wheel assembly is capable of rotating and then flipping forwards to be folded onto the top surface of the supporting base in a minimum dimension via the rear rotation assembly.

Preferably, the front rotation assembly comprises a front hinge mechanism with a front hinge and a front connecting mechanism with a front shaft; the front wheel assembly is capable of rotation about the front shaft proximately from a vertical position to a horizontal position relative to the supporting base; and the front wheel assembly is further capable of flipping backwards about the front hinge for folding the front wheel assembly onto the supporting base and flipping reverse for unfolding the same.

Preferably, the front hinge is vertical to the front shaft; the front hinge is parallel to the top surface of the supporting base; the front shaft is parallel to the top surface of the supporting base; and the front hinge is inserted through the front shaft.

Preferably, the front hinge mechanism further comprises a front seat extending upwards from the front end of the supporting base; the front hinge is rotatably inserted through the front seat and/or is rotatably inserted through the front connecting mechanism; the front hinge together with the front wheel assembly via the front connecting mechanism is rotatable relative to the front seat, and/or the front wheel assembly via the front connecting mechanism is rotatable about the front hinge.

Preferably, the front connecting mechanism further comprises a front first sleeve and a connecting structure for connecting the front wheel assembly to the front hinge mechanism; the connecting structure comprises a front second sleeve; both the front first sleeve and the front second sleeve are parallel and respectively fitted on the front shaft; the front second sleeve is rotatable about the front shaft.

Preferably, the connecting structure further comprises a head tube and a connecting base connected between the head tube and the second sleeve; the head tube is sleeved on the front fork; the front second sleeve is proximately horizontal; the head tube is proximately upright and aligned to the steering bar; the connecting structure is integral and inseparable.

Preferably, the front fork comprises two branches and a main stem; the main stem is inserted in the head tube and with a top end of the main stem connected with a bottom end of the steering bar.

Preferably, the steering bar is foldable downwards to the front wheel assembly via a loose-leaf hinge of both hinged leaves with one leaf attached to a bottom end of the steering bar and the other leaf of the loose-leaf hinge attached to a top end of the front fork.

Preferably, a locking mechanism is provided to lock and support the front connecting mechanism on the supporting base, and comprises an supporting plate extending upwards from the front end of the supporting base, a pair of rods perpendicularly and respectively extending from a front and a rear plate surfaces of the supporting plate, and a pair of grips formed on the front second sleeve; the supporting plate forms an arc-shaped top end for receiving the front second sleeve; the pair of grips downwards extends from the outer surface of the front second sleeve, is able to grip the rod for locking the front connecting mechanism, and able to release the rod for folding the front wheel assembly.

Preferably, the supporting base comprises a goods-carrying body for carry goods and a left and a right foot pedals for carrying a user; at least one rechargeable battery is provided in the supporting base to supply an electric power to drive the scooter to move; a pair of truckles and a drawbar are provided to the scooter for the user to drag the scooter to roll on the ground.

Preferably, the rear rotation assembly comprises a rear hinge mechanism with a rear hinge and a rear connecting mechanism with a rear shaft; the rear wheel assembly is capable of rotation about the rear shaft proximately from a vertical position to a horizontal position relative to the supporting base; and the rear wheel assembly is further capable of flipping forwards about the rear hinge for folding the rear wheel assembly onto the supporting base and flipping reverse for unfolding the same.

Preferably, the rear hinge is vertical to the rear shaft; the rear hinge is parallel to the top surface of the supporting base; the rear shaft is parallel to the top surface of the supporting base; and the rear hinge is inserted through the rear shaft.

Preferably, the rear hinge mechanism further comprises a rear seat extending upwards from the rear end of the supporting base; the rear hinge is rotatably inserted through the rear seat and/or is rotatably inserted through the rear connecting mechanism; the rear hinge together with the rear wheel assembly via the rear connecting mechanism is rotatable relative to the rear seat, and/or the rear wheel assembly via the rear connecting mechanism is rotatable about the rear hinge.

Preferably, the rear connecting mechanism further comprises a rear first sleeve and a rear second sleeve; both the rear first sleeve and the rear second sleeve are parallel and respectively fitted on the rear shaft; the rear second sleeve is rotatable about the rear shaft.

Preferably, the rear fork comprises two branches and a main stem; the main stem of the rear fork is configured as the rear second sleeve.

Preferably, a locking mechanism is provided to lock and support the rear connecting mechanism on the supporting base, and comprises an supporting plate extending upwards from the rear end of the supporting base, a rod perpendicularly and respectively extending from a front and rear plate surfaces of the supporting plate, and a pair of grips formed on the rear second sleeve; the supporting plate forms an arc-shaped top end for receiving the rear second sleeve; the pair of grips downwards extends from the outer surface of the rear second sleeve, is able to grip the rod for locking the rear connecting mechanism, and able to release the rod for folding the rear wheel assembly.

Preferably, the handle bar comprises a main rod and two hand grips hinged at both opposite ends of the main rod; the hand grips are able to be folded downwards to parallel to the steering bar; each hand grip forms a tongue-shaped end, and each end of the main rod forms a longitudinal notch with top and bottom sides open for receiving the tongue-shaped end of the hand grip.

A method of folding a foldable scooter provided in accordance with the embodiments of the present invention, comprises: folding downwards both hand grips from a main rod until the hand grips parallel to a steering bar; folding the steering bar back and downwards to a front wheel assembly via a loose-leaf hinge until the steering bar parallels to a front wheel; rotating about 90 degrees clockwise or anticlockwise the front wheel assembly round a front shaft until the front wheel assembly approximately parallels to a supporting base; flipping backwards the front wheel assembly via a front hinge until the front wheel assembly is received on the supporting base with one radial face of the front wheel facing a top surface of the base; rotating a rear wheel assembly around a rear shaft until radial faces of the rear wheel are substantially horizontal or parallel to the supporting base; and flipping forwards the rear wheel assembly via a rear hinge until the rear wheel assembly is received on the supporting base with one radial face of a rear wheel facing the top surface of the base; thereby the scooter is folded to a minimum dimension for being dragged or placed.

The physical embodiments adopted in the present invention will be presented by the following depicted embodiments and accompanying drawings for further explanations.

DETAILED DESCRIPTION OF THE INVENTION

In order to facilitate understanding of the present invention, the following descriptions accompanying attached drawings are presented to further completely describe the present invention. Attached drawings show a preferred embodiment of the present invention. However, the present invention may be implemented by many different forms thereof and is not limited to the preferred embodiments described herein. On the contrary, the purpose of providing these embodiments is for much more thorough and entire understanding of the published disclosure of the present invention.

Figure 1:
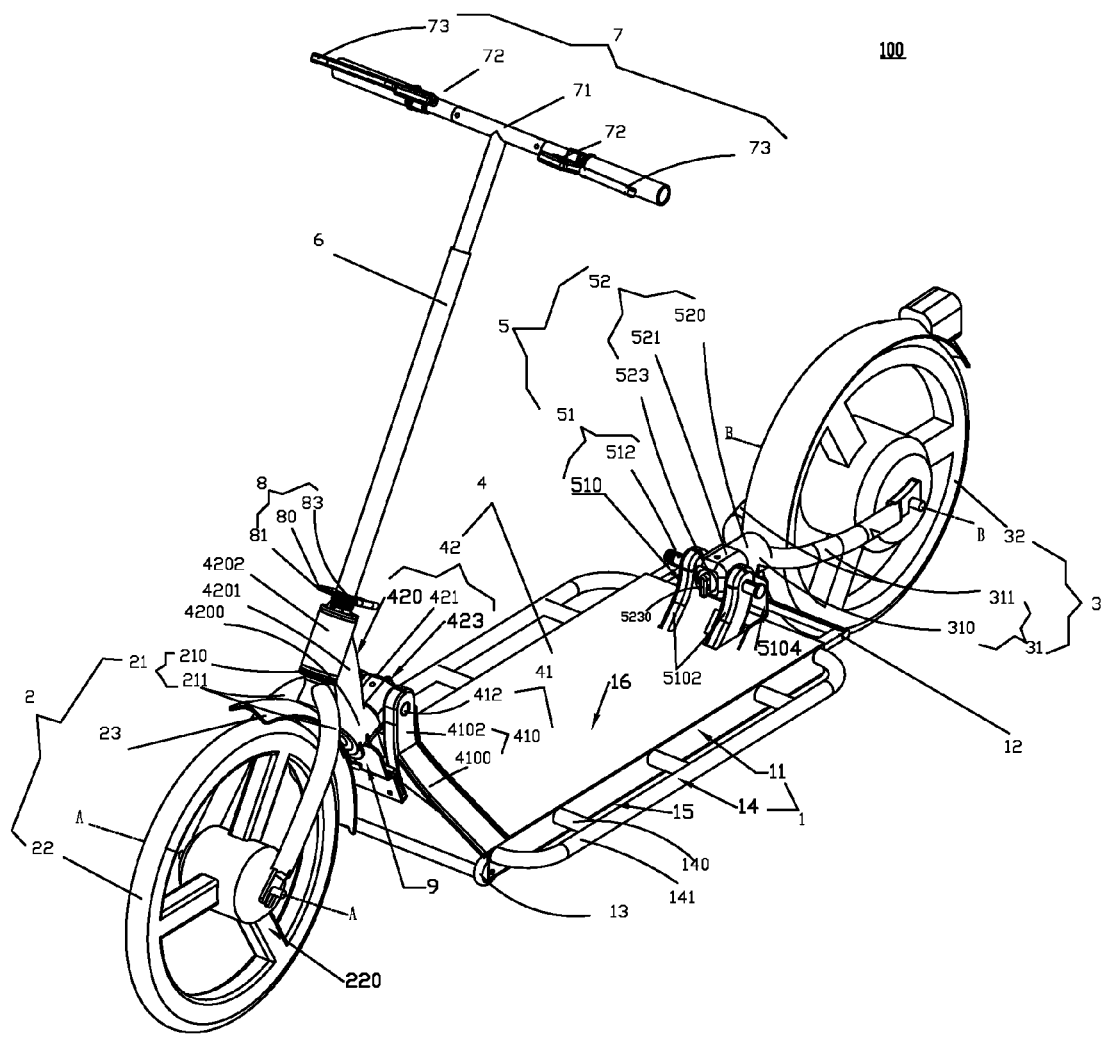
FIG. 1 is a perspective view of a foldable scooter in accordance with a first embodiment of the present invention.
Figure 2A:
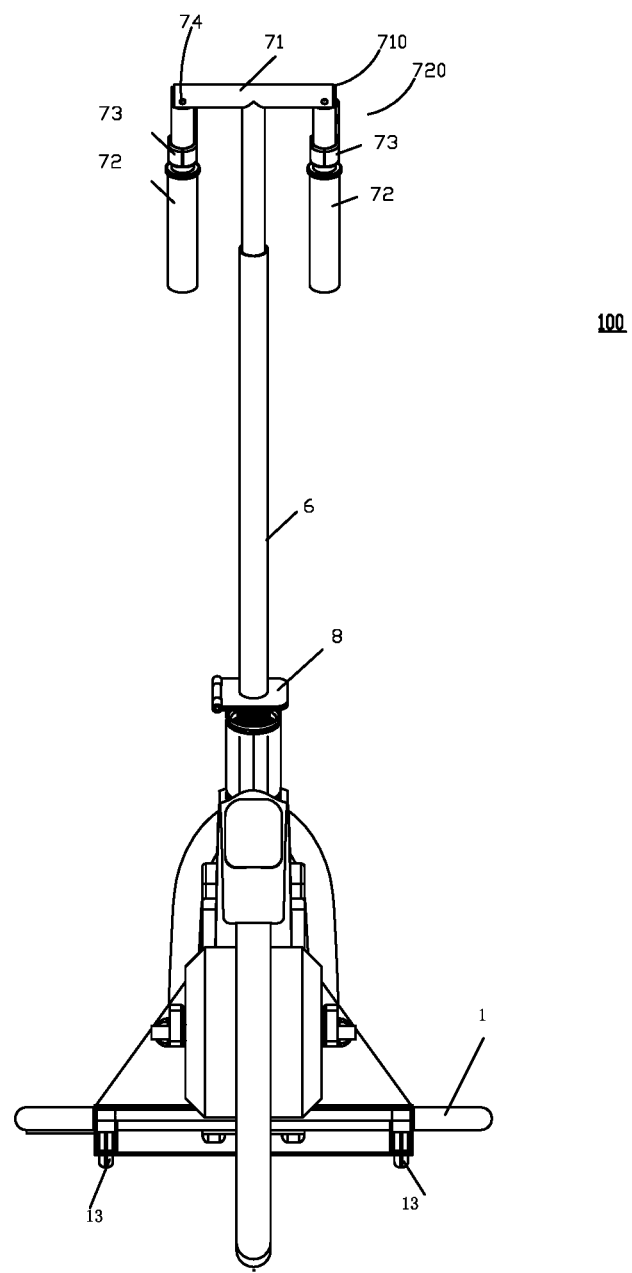
FIGS. 2A to 2F shows a folding method of the foldable scooter of FIG. 1 in series of folding states from FIGS. 2A to 2F.
Figure 2B:
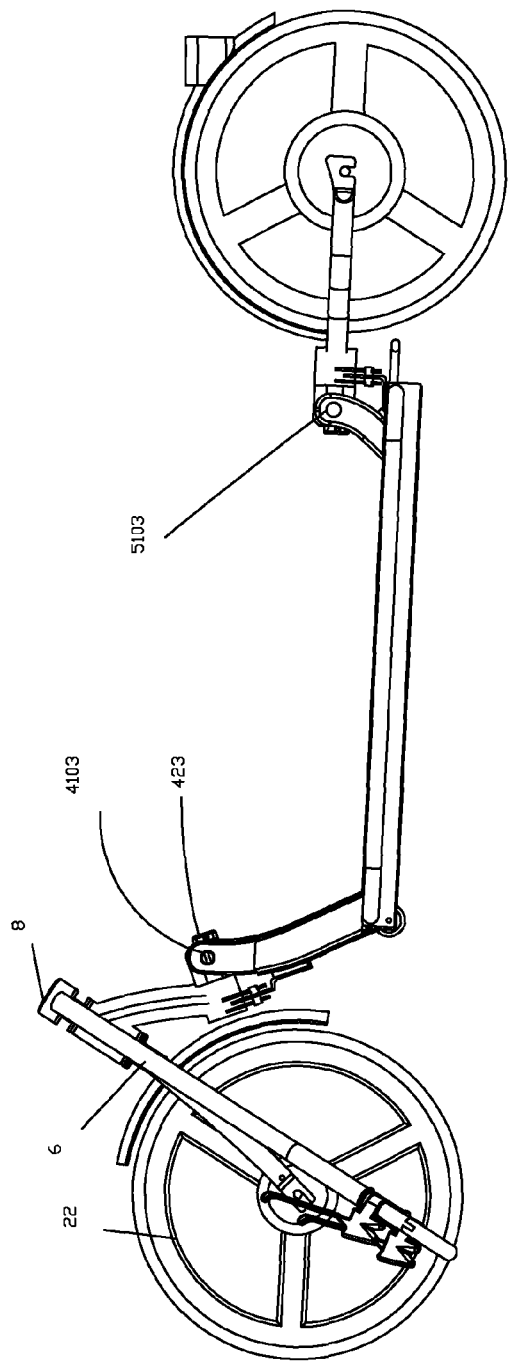
Figure 2C:
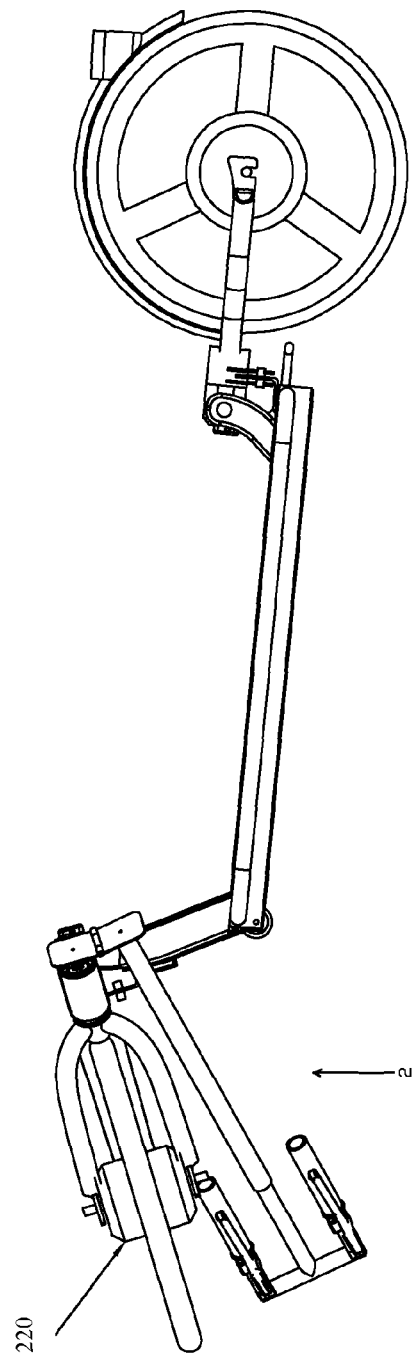
Figure 2D:
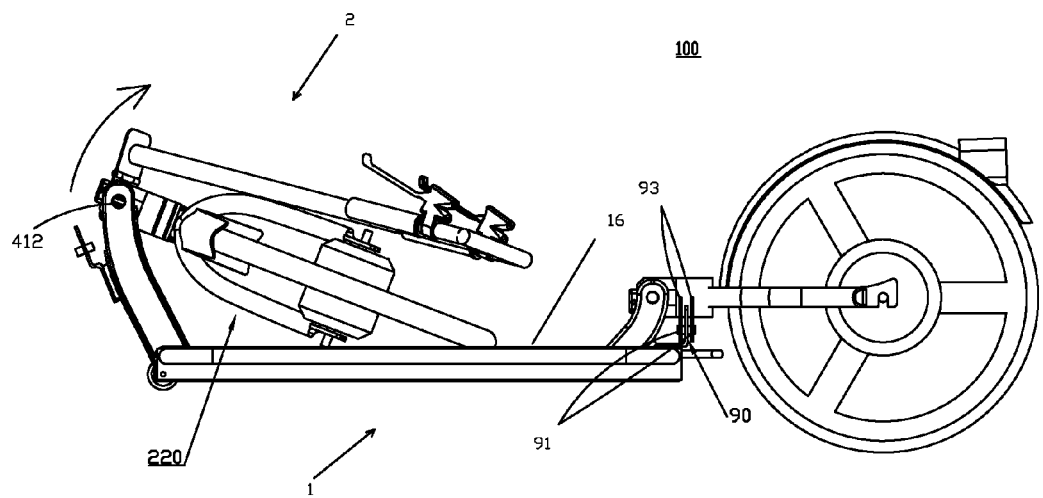
Figure 2E:
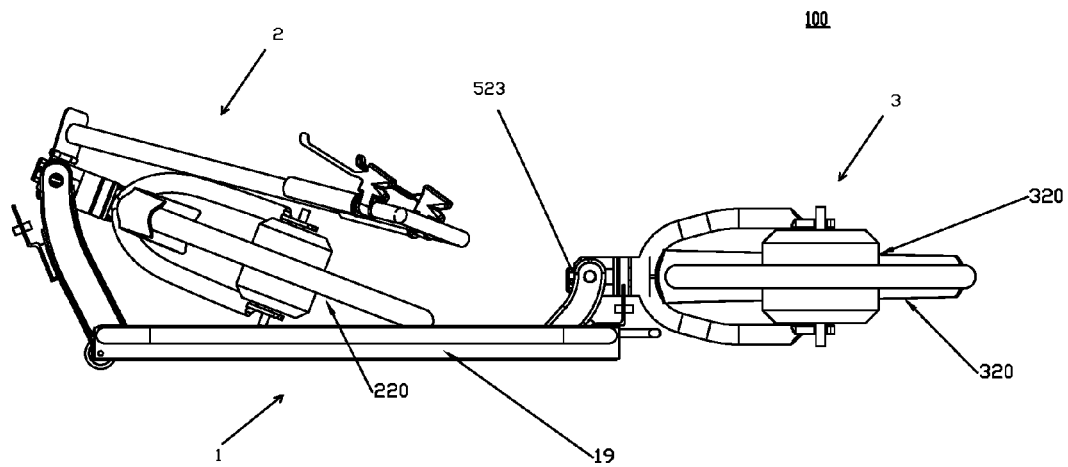
Figure 2F:
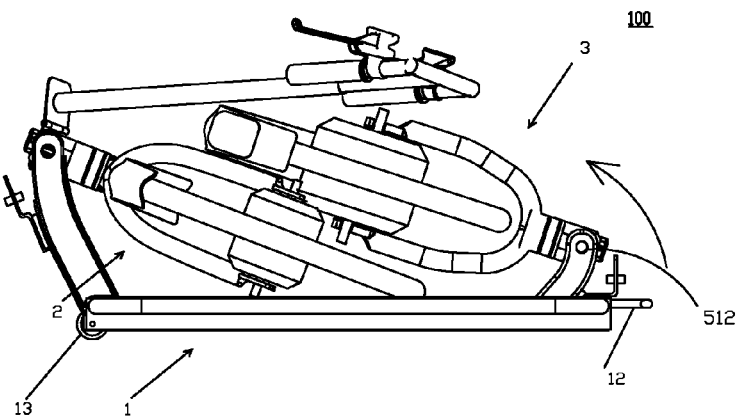
Figure 3:
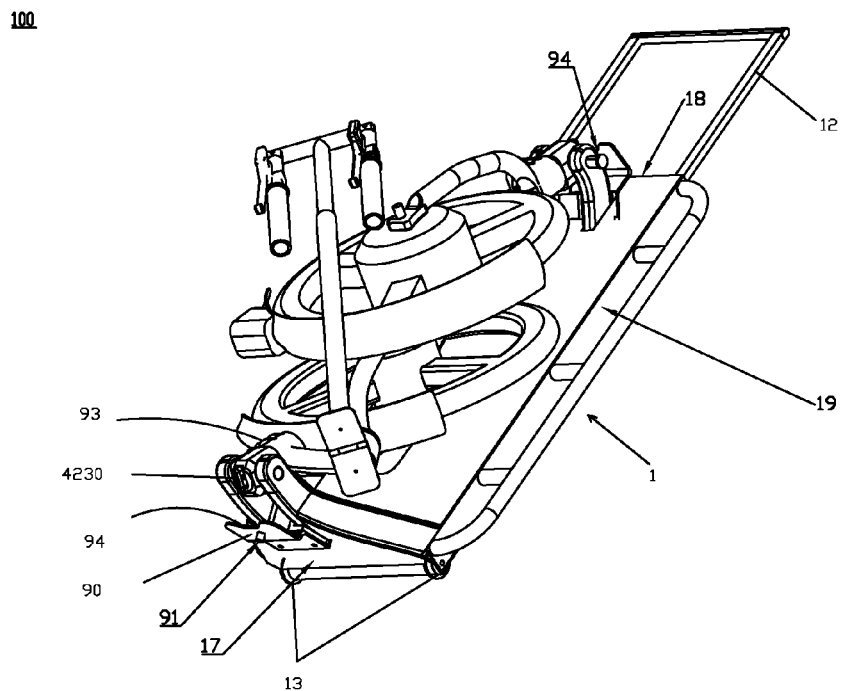
FIG. 3 shows the foldable scooter of FIG. 1 in a dragged state.

Referring to FIGS. 1-3, a foldable scooter 100 in accordance with a first embodiment of the present invention, comprises a supporting base 1 for the operator to rest thereon and for transport goods or cargoes, a front wheel assembly 2 and a rear wheel assembly 3 respectively connected at a front end 17 and a rear end 18 of the supporting base 1, a steering bar 6 and a handlebar 7. The steering bar 6 is foldably connected with the front wheel assembly 2. The handlebar 7 is foldably supported at a top end of the steering bar 6. A front rotation assembly 4 is provided at the front end 17 of the supporting base 1 and a rear rotation assembly 5 is provided at the rear end 18 of the supporting base 1. The front wheel assembly 2 is foldably engaged with the supporting base 1 with a reverse flip via the front rotation assembly 4; and the rear wheel assembly 3 is foldably engaged with the supporting base 1 with a forward flip via the rear rotation assembly 5. The steering bar 6 is foldably connected with the front wheel assembly 2 via a hinge mechanism 8.

The supporting base 1 is configured with a certain length and width for loading goods and for the user to stand thereon, and preferably has relatively much broader width and longer length than usual scooters, such structure is possible to stack goods thereon. The supporting base 1 may be shaped about a rectangle, can also be configured as other shapes capable of carrying goods and the user. The supporting base 1 comprises a goods-carrying body 11 and foot pedals 14. In this embodiment, the supporting base 1 is configured as a horizontal board with a top surface 16 and a reverse back 15. Accordingly, the goods-carrying body 11 is a horizontal board in this embodiment; and it may be a frame structure too. Goods or cargos are loaded on the top surface 16 of the body 11 or both the body 11 and the pedals 14. The foot pedals 14 have two respectively for the left foot and the right foot of the user. In this embodiment, the pedals 14 extend from the left and right sides 19 of the supporting base 1 for the user to stand thereon, and are a rod-frame structure configured via more than one lateral rod 140 and a fore-and-aft rod 141 connected with those outwards ends of all the lateral rods 140 at each the left and right side 19. Therefore, the pedals 14 in this embodiment can also support goods together with the board 1 in this embodiment. Each pedal 14 can be configured able to retractably extend from the left and right sides 19 of the base 1 so that the pedals 14 can be retracted in the left and right sides 19 of the supporting base 1 in such way that the lateral rods 140 can be received in the base 1 and accordingly the fore-and-aft rods 141 can be placed respectively along the left and right sides 19 of the base 1 for reducing the unused volume. Accordingly, the pedals 14 can be drawn out from the base 1 for the user to stand thereon in use. It is understood that the pedals 14 can be configured that are able to be folded upwards or downwards relatively to the horizontal base 1 to reduce the width of the base 1 when the scooter 100 is not used.

A pair of truckles 13 is rotatably pivoted to the back 15 of the base 1 and a drawbar 12 is further provided to the base 1. Preferably, the pair of the truckles 13 is located at one end such as the front end of the base 1 at it back 15, and the drawbar 12 is preferably located at where is opposite and farthest to the truckles 13 such as the rear end 18 of the base 1 in such way to easily drag and move the scooter when the user doesn't need to use the scooter 100 to transport goods but needs to place the scooter in trucks or the house. It is understood that the truckles 13 can be more or less than one pair (such as only one truckle) and may be located at any proper position of the back 15 or anywhere of the scooter 100. The drawbar 12 is preferably located at the back 15 and at the rear end 18 of the base 1 (as same as FIG. 6) and can be drawn out from the back 15 to extend rearwards, namely, the drawbar 12 can be retractably engaged with the rear end 18 of the base 1. The drawbar 12 may be pivoted to the supporting base 1. The drawbar 12 is used for the user to drag the scooter 100 when the scooter 100 is unused or folded, and the scooter 100 can roll forwards on the ground via the truckles 13.

Figure 6:
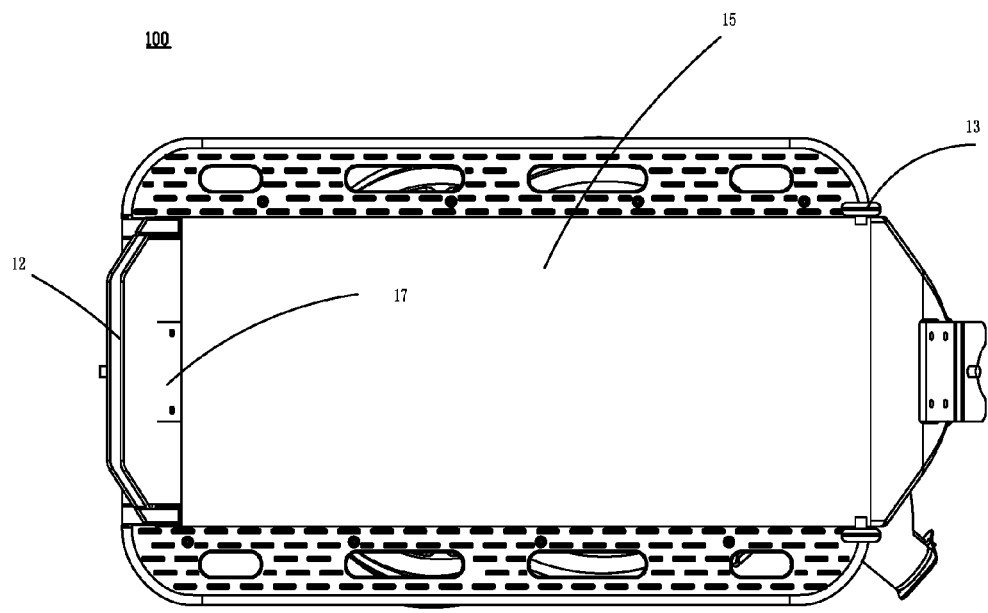
FIG. 6 is a bottom view of the foldable scooter of FIG. 4 in the folded status with the second embodiment of the present invention.

At least one rechargeable battery (not shown) is provided in the base 1 and is covered via a removable battery cover 17 (referring to FIG. 6). The rechargeable battery supplies an electric power to drive the scooter 100 to move. Usually, the battery is located at a rear end of the base 1 and is used to drive a rear wheel 32.

The front wheel assembly 2 comprises a front fork 21, a front wheel 22 and a front mud guard 23. The front wheel 22 is pivoted within the front fork 21. The front fork 21 is vertically supported above the front wheel 22 and is engaged with the steering bar 6 at the bottom end of the steering bar 6. The front fork 21 has a vertical main stem 210 and two branches 211 extending downwards from the bottom end of the main stem 210, and the top end of the main stem 210 is connected with the bottom end of the steering bar 6. Both radial faces 220 of the front wheel 22 are defined herein for referring both side faces of the wheel 22 to which the center axis AA is perpendicular.

The front rotation assembly 4 comprises a front hinge mechanism 41 and a front connecting mechanism 42. The front wheel assembly 2 is able to rotate and then be folded to the support board 1 with a backward flip via the front rotation assembly 4. In this embodiment, the front wheel assembly 2 is able to flip forwards-backwards relative to the support base 1 via the front hinge mechanism 41 so that the front wheel assembly can be folded to the top surface 16 of the base 1; and the front wheel assembly 2 can wholly rotate clockwise or anticlockwise at a vertical plane relative to the supporting base 1 via the front connecting mechanism 42 so that the front wheel 22 can rotate approximately from a vertical position to a horizontal position and parallel to the base 1 for being better folded. The front hinge mechanism 41 comprises a front seat 410 and a front hinge 412 pivoted in the front seat 410. The front wheel assembly 2 is hinged to the front seat 410 via the front hinge 412. The front seat 410 extends upwards from the front end of the base 1 and forms a guard structure for holding the goods at the front end 17 of the supporting base 1. The front seat 410 extends upwardly and at an angle relative to the horizontal base 1. The front seat 410 forms a frame structure shaped about a triangle with both sides 4100 at a bottom end connecting with the front end of the base 1, and preferably respectively connecting with the left and right front corners of the base 1, and the front edge of the base 1 forms the bottom side of the triangle of the front seat 410. The top of the front seat 410 forms a pair of upright arms 4102 each of which extends from a top end of each side 4100 of the front seat 410. Each upright arm 4102 forms a bearing hole 4103 therethrough. The bearing holes 4103 are horizontally aligned. The front hinge 412 is inserted in the front seat 410 with both ends of the hinge 412 respectively through the bearing holes 4103. The hinge 412 is parallel to the top surface 16 of the supporting base 1, and parallel to the width namely the front edge of the supporting base 1 in the embodiment. The front wheel assembly 2 is able to rotate to and be folded to the front surface 16 of the supporting base 1 via the front hinge 412 with a back flip. In this embodiment, the front hinge 412 is parallel to a rotating axis AA (center axis) of the front wheel 22.

It is understood that, the front hinge 412 can be configured that is rotatable relative to the front seat 410, namely, the front hinge 412 is rotatably inserted in the bearing holes 4103. In other embodiments, the front hinge 412 can also be configured that is not rotatable in the bearing holes 4103 while the front wheel assembly 2 via the front connecting mechanism 42 is rotatable about the front hinge 412 for being folded. The front connecting mechanism 42 can be configured that is not rotatable relative to the front hinge 412 when the front hinge 412 is rotatable in the bearing hole 4103 in such way that the front hinge 412 together with the front mechanism 42 and the front wheel assembly 2 as a whole rotate relative to the front seat 410 for being folded.

The front connecting mechanism 42 comprises a front connecting structure 420, a front first sleeve 421 and a front shaft 423. The front connecting structure 420 is used to connect the front wheel assembly 2 with the supporting base 1 at the front end 17 of the supporting base 1; and comprises a head tube 4202, a connecting base 4201 and a front second sleeve 4200. The head tube 4202 is coaxially sleeved out of the vertical main stem 210 of the front fork 21. The main stem 210 of the front fork 21 forms both expanded top and bottom ends or forms external threads at both ends thereof for holding the head tube 4202 therebetween around the main stem 210. The front fork 21 is rotatably engaged with the head tube 4202; accordingly, the main stem 210 of the fork 21 is rotatably fitted in the head tube 4202 and connects with the bottom end of the steering bar 6, thereby the front wheel assembly 2 can be driven to turn left or right by the steering bar 6 for adjusting the moving direction of the scooter 100. The head tube 4202 substantially is an upright tube coaxially with the front fork 21 and the steering bar 6, and is sleeved on the main stem 210 of the fork 21. The connecting base 4201 substantially is a straight tube structure in this embodiment, but may be configured as any other applicable structure for connecting the head tube 4202 and the front second sleeve 4200. The front second sleeve 4200 substantially is a horizontal tube in this embodiment, and coaxially parallel and aligned to the first sleeve 421 at a front end of the first sleeve 421. The front second sleeve 4200 is rotatable relative to the first sleeve 421; thereby the front wheel assembly 2 is rotatable relative to the first sleeve 421 and accordingly rotatable relative to the front seat 410. The connecting base 4201 is connected between the head tube 4202 as an upright tube and the front second sleeve 4200 as a horizontal tube in accordance with this embodiment. Both ends of the connecting base 4201 extend respectively from both tube walls of the head tube 4202 and the front second sleeve 4200. Thereby, the connecting base 4201 is an inclined pipe structure and as a hypotenuse of the right angle formed by extending the head tube 4202 and the front second sleeve 4200 in this embodiment. The connecting structure 420 is preferably an integral and inseparable structure for good strength.

A front first sleeve 421 is a pipe structure too, and is perpendicularly pivoted to the front hinge 412 and is mounted between both arms 4102, thereby the front first sleeve 421 is able to rotate about the front hinge 412 or rotate via the front hinge 412 relative to the front seat 410. The front hinge 412 is inserted and transverses through the front first sleeve 421, and thus perpendicular to the central axis of the sleeve 421.

The front shaft 423 is inserted through both the front first sleeve 421 and the front second sleeve 4200 with the front first sleeve 421 sleeved on the rear end of the front shaft 423 and the front second sleeve 4200 sleeved on the front end thereof. Both ends of the shaft 423 respectively form a locking member 4230 to hold both the front first sleeve 421 and the second sleeve 4200 not to leave the shaft 423. In this embodiment, the locking member 4230 is a knob. The front second sleeve 4200 is able to rotate about the shaft 423 perpendicular to the front hinge 412, and is further able to flip around the front hinge 412. The front first sleeve 421 is not rotatable around the front shaft 423, the front hinge 412 is perpendicularly inserted through both the front first sleeve 421 and the front shaft 423. The front hinge 412 and the front shaft 423 are horizontal to the top surface 16 of the supporting base 1 and are perpendicularly engaged each other in a rotatable or not rotatable way.

The steering bar 6 connects the main stem 210 of the front fork 21 via the hinge mechanism 8, and is able to control the moving direction of the front wheel 22 by the user. The steering bar 6 is an upright rod or tube. The hinge mechanism 8 is a flap or a loose-leaf hinge which includes both hinged leaves 80, 81, while a top leaf 80 is attached to the bottom end of the steering bar 6 and a bottom leaf 81 is attached to the top end of the front fork 21, one side of each leaf 80, 81 is hinged together by a hinge 83 so that both leaves 80, 81 can be opened or closed from the other side opposite to the hinge side. Therefore, the steering bar 6 can be folded downwards via opening the loose-leaf hinge 8. A locking member may be supplied to the hinge mechanism 8 to lock the loose-leaf when the steering bar 6 is unfolded.

The handlebar 7 is horizontally supported on the top end of the steering bar 6, and comprises a main rod 71 and two hand grips 72 extending from each end of the main rod 71. Two hand brakes 73 respectively are provided to each hand grip 72 to stop the scooter 100 if necessary. The hand grips 72 are foldable from the main rod 71. Each hand grip 72 is hinged opposite ends of the main rod 71. In this embodiment, one end of the hand grip 72 is tongue-shaped, and each end of the main rod 71 correspondingly forms a notch 710 along the length of the main rod 71 with top and bottom sides open for receiving the tongue-shaped end 720 of the hand grip 72 to be folded downwards. Hinge holes 74 are formed both through each end of the main rod 71 and the tongue-shaped end 720 of the hand grip 72, a hinge (not labeled) such as a screw or pin is inserted through the hinge hole 74. The hand grip 72 is hinged to the end of main rod 71 and is capable of folding downwards until being parallel to the steering bar 6.

The front shaft 421 is parallel to the supporting base 1 and in a fore-and-aft direction, and horizontally suspends above the front end of the base 1. A front locking mechanism 9 is provided to lock and support the front connecting mechanism 42 on the base 1, and comprises an upright supporting plate 90, a pair of rods 91, and a pair of grips 93 formed on the second sleeve 4200. The supporting plate 90 extends upwards from the front end 17 of the supporting base 1 with an arc-shaped top end 94 for receiving the second sleeve 4200. The rods 91 extend perpendicularly and respectively from the front and rear plate surfaces of the supporting plate 90. Each of the pair of grips 93 extends downwards from the outer surface of the second sleeve 4200 and is able to respectively grip the rods 91 for locking the front connecting mechanism 42, and able to release the rod 91 for folding the front wheel assembly 2. It is understood that the rod 91 and the grip 93 are at least one but not limited to a pair.

The rear wheel assembly 3 comprises a rear fork 31 and a rear wheel 32. The rear fork 31 comprises a main stem 310 and two branches 311 extending from the rear end of the main stem 310. The rear fork 31 is horizontally disposed in this embodiment. Both free ends of two branches 311 are pivoted at the central axis BB of the rear wheel 32, and the rear wheel 32 is rotatably mounted in the rear fork 31. The front end of the rear fork 31 is rotatably mounted at the rear end 18 of the supporting base 1 via the rear rotation assembly 5, and the rear fork 31 together with the rear wheel 32 is able to flip forward for being folded to the supporting base 1 and backward for being unfolded. Both radial faces 320 are defined herein for referring both side faces of the wheel 32 to which the center axis BB of the wheel 32 is perpendicular.

The rear rotation assembly 5 comprises a rear hinge mechanism 51 and a rear connecting mechanism 52. The rear wheel assembly 3 is able to rotate and be folded to the support base 1 with a forward flip via the rear hinge mechanism 51. In this embodiment, the rear wheel assembly 3 is able to flip forwards-backwards relative to the support base 1 via the rear hinge mechanism 51 so that the rear wheel assembly can be folded to the top surface 16 of the base 1; and the rear wheel assembly 3 can wholly rotate clockwise or anticlockwise at a vertical plane relative to the supporting base 1 via the rear connecting mechanism 52 so that the rear wheel 32 can rotate to be approximately from a vertical position to a horizontal position and parallel to the base 1 for being better folded. The rear wheel assembly 3 is connected to the supporting base 1 and is able to rotate via the rear connecting mechanism 52. The rear hinge mechanism 51 comprises a rear seat 510 and a rear hinge 512 pivoted in the rear seat 510. The rear wheel assembly 3 is hinged to the rear seat 510 via the rear hinge 512. The rear seat 510 extends upwards from the rear end 18 of the base 1 and forms a guard structure for holding the goods at the rear end 18 of the supporting base 1. The rear seat 510 extends upwards and at an angle relative to the horizontal base 1. The rear seat 510 forms a pair of upright arms 5102 each of which extends from the rear end 18 of the base 1. Each upright arm 5102 forms a bearing hole 5103 therethrough in a direction parallel to the top surface 16 of the supporting base 1. The bearing holes 5103 are horizontally aligned. The rear hinge 512 is inserted in the rear seat 510, and both ends of the hinge 512 are respectively inserted in the bearing holes 5103. The hinge 512 is parallel to the top surface 16 of the supporting base 1, and preferably parallel to the width namely the rear edge of the supporting base 1 in this embodiment. The rear wheel assembly 3 is able to rotate to be folded to the rear surface 16 of the supporting base 1 via the rear hinge 512 with a forward flip. In this embodiment, the rear hinge 512 is parallel to a rotating axis BB of the rear wheel 32.

The rear connecting mechanism 52 comprises a rear first sleeve 521, a rear second sleeve 520, and a rear shaft 523. In this embodiment, the second sleeve 520 is configured the same element as the main stem 310 of the rear fork 31 in this embodiment; namely, the main stem 310 of the rear fork 31 is used as the rear second sleeve 520.

The rear second sleeve 520 substantially is a horizontal tube, coaxially and parallel aligned to the first sleeve 521 at a front end of the first sleeve 521. The rear second sleeve 520 is rotatable relative to the first sleeve 521; thereby the rear wheel assembly 3 is rotatable relative to the first sleeve 521 and accordingly rotatable relative to the rear seat 510 or the base 1.

The first rear sleeve 521 is a pipe structure too, and is perpendicularly pivoted to the rear hinge 512 and is mounted between both arms 5102, thereby the rear first sleeve 521 together with the rear wheel assembly 3 is able to rotate and flip forwards and rearwards about the rear hinge 512. The rear hinge 512 is inserted and transverse through the rear first sleeve 521, and thus perpendicular to the central axis of the sleeve 521.

The rear shaft 523 is fitted in both the rear first sleeve 521 and second sleeve 520 with the rear first sleeve 521 sleeved on the rear end of the rear shaft 523 and the rear second sleeve 520 sleeved on the front end thereof. The front end and/or the rear end of the shaft 523 forms a locking member 5230 to hold both the rear first sleeve 521 and the second sleeve 520 not to leave the shaft 523. In this embodiment, the locking member 5230 is a knob. The rear second sleeve 520 together with the rear wheel assembly 3 is able to rotate about the shaft 523 perpendicular to the rear hinge 512 and at a vertical plane relative to the base 1 from a proximately vertical position to a horizontal position, and then further flip about the rear hinge 512, in such way for being better folded onto the top surface 16 of the supporting base 1. Herein, the rear shaft 523 is fixed in the first sleeve 521 via the rear hinge 512 inserted therethrough. In another embodiment, the rear shaft 523 and the second sleeve 520 together constitute the main stem 310, and the rear shaft 523 integrally and inseparably extends from the second sleeve 520, and is rotatably inserted in the first sleeve 521 and the rear hinge 512. Therefore, the main stem 310 together with the rear wheel assembly 3 rotates in the first sleeve 521 with the radial sides 320 of the wheel 32 from a vertical position to a horizontal position, and then flips forwards about the hinge rear 512 for being better folded with the rear wheel being parallel to the top surface 16 of the supporting base 16.

In other embodiments, the main stem 310 and the rear second sleeve 520 can also be configured as two separable elements which are coaxially and parallel aligned and fitted on the rear shaft 523.

The rear connecting mechanism 52 is parallel to the supporting base 1 and in a fore-and-aft direction, and horizontally suspends above the rear end 18 of the base 1. Another locking mechanism 9 is also supplied to lock and support the rear connecting mechanism 52 on the base 1, and comprises one upright supporting plate 90, one pair of rods 91, and one pairs of grips 93 formed on the second sleeve 520. The supporting plate 90 extends upwards from the rear end of the supporting base 1 with an arc-shaped top end 94 for receiving the second sleeve 520. The rod 91 extends perpendicularly and respectively from front and/or rear plate surfaces of the supporting plate 90. The pair of grips 93 extends downwards from the outer surface of the second sleeve 520 and is able to grip the rod 91 for locking the rear connecting mechanism 52, and are able to release the rod 91 for folding the rear wheel assembly 3. It is understood, there may be only one or more than tow rods 91 and grips 93.

It is understood that, the rear hinge 512 can rotate relative to the rear seat 510, namely, the rear hinge 512 can be configured to be rotatably inserted in the bearing holes 5103. In other embodiments, the rear hinge 512 can also be configured that is not rotatable in the bearing holes 5103 when the rear connecting mechanism 52 with the rear wheel assembly 3 can rotate about the rear hinge 512 for being folded. Accordingly, the rear connecting mechanism 52 can rotate relative to the rear hinge 512, and the hinge 512 is rotatably inserted through the rear first sleeve 521 and the rear shaft 523. In other embodiments, the rear connecting mechanism 52 may be not rotatable relative to the rear hinge 512 when the rear hinge 512 is rotatable in the bearing hole 5103 in such way that the rear hinge 512 together with the rear mechanism 52 and the rear wheel assembly 3 as a whole rotates relative to the rear seat 510 for being folded onto the base 1.

FIGS. 2A-2F shows a method of folding the scooter 100, comprising: folding downwards both hand grips 72 together with the hand brakes 73 from the main rod 71 until the hand grips 72 parallels to the steering bar 6 as shown in FIG. 2A; folding the steering bar 6 back and downwards to the front wheel assembly 2 via the loose-leaf hinge 8 until the steering bar 6 parallels to the front wheel 22 as shown in FIG. 2B; rotating about 90 degrees clockwise or anticlockwise the front wheel assembly 2 round the front shaft 423 until the front wheel 23 may approximately parallel to the supporting base 1; flipping backwards the front wheel assembly 2 via the front hinge 412 until the front wheel assembly 2 is received on the supporting base 1 with one radial face 220 of the front wheel 22 facing the top surface 16 of the base 1 as shown in FIG. 2D; rotating the rear wheel assembly 3 around the rear shaft 523 until the radial faces 320 of the rear wheel 32 are substantially horizontal or parallel to the supporting base 1 as shown in FIG. 2E; and flipping forwards the rear wheel assembly 3 via the rear hinge 512 until the rear wheel assembly 3 is received on the supporting base 1 with one radial face 320 of the rear wheel 32 facing the top surface 16 of the base 1 as shown in FIG. 2F. Therefore, the scooter 100 is folded to a minimum size for being dragged or placed. If the user needs to drag the scooter 100, then pull out the drawbar 12 from the rear end 18 of the base 1 (as shown in FIG. 3), and the scooter 100 can roll on the ground via the truckles 13 in such way that the user can easily move the scooter 100. In the folded states, the front wheel 22 and the rear wheel 32 can rotate about the front and rear shaft 423/523 so that radial faces 220/320 become approximately parallel to the top surface 16 of the supporting base 1 or keep horizontal. The front wheel 22 can flip backwards about the front hinge 412 to be folded on the supporting base 1 while the front wheel 22 is firmly supported by the front seat 410 and the supporting base 1 at opposite sides thereof (not labeled) and with one radial face 220 thereof facing the top surface 16 of the supporting base 1. The rear wheel 32 can flip forwards about the rear hinge 512 to be folded on the supporting base 1 while the rear wheel 32 is firmly supported by the rear seat 510 and the supporting base 1 at opposite sides thereof (not labeled) and with one radial face 320 thereof facing the top surface 16 of the supporting base 1.

Figure 4:
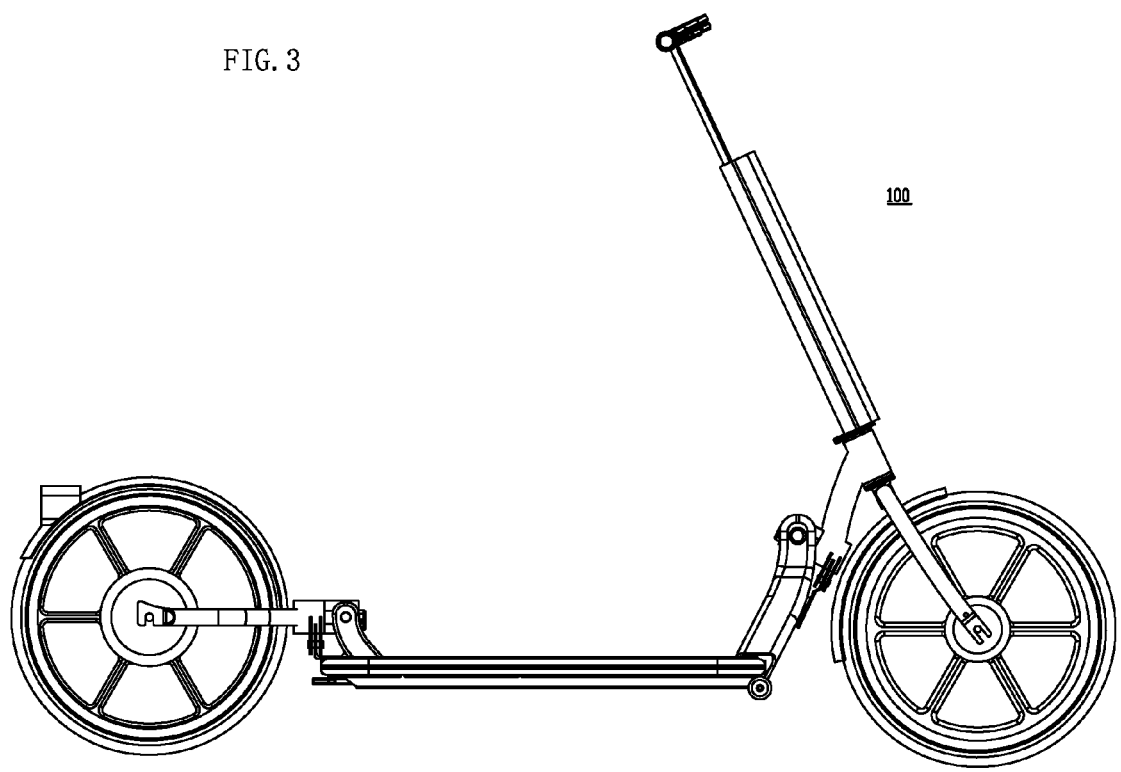
FIG. 4 is a side view of a foldable scooter in accordance with a second embodiment of the present invention.
Figure 5A:
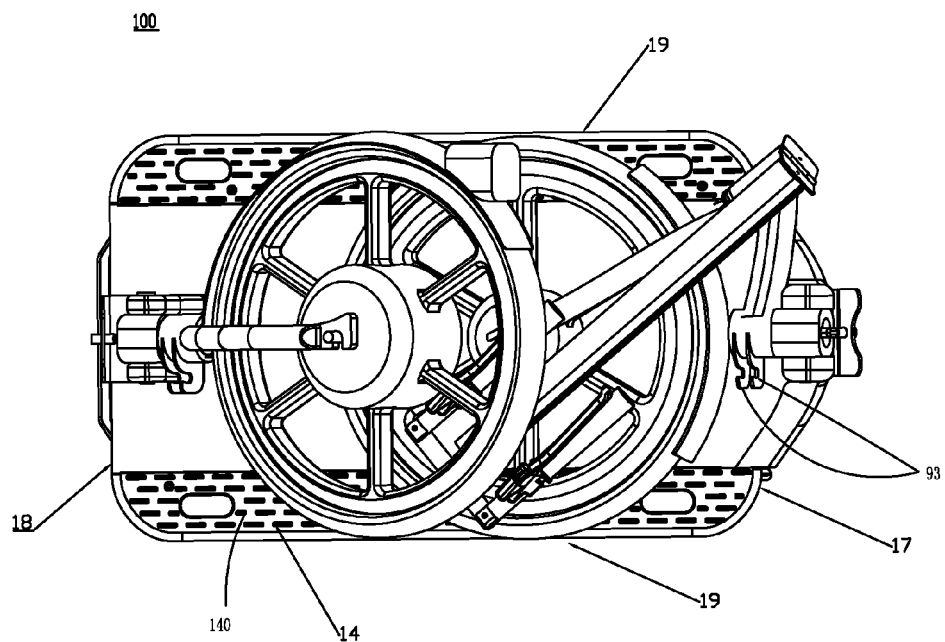
FIG. 5A is a top view of the foldable scooter in a folded status with the second embodiment of the present invention.
Figure 5B:
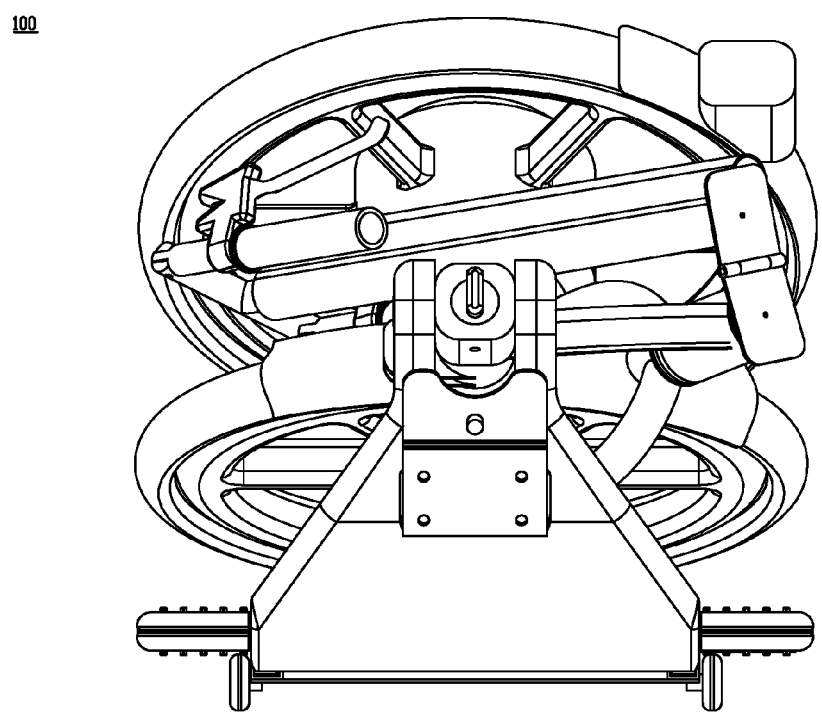
FIG. 5B is a front view of the foldable scooter in a folded status with the second embodiment of the present invention.

Referring to FIGS. 4 to 6, the scooter 100 in accordance the second embodiment of the present invention, has the foot pedal 14 configured at the right and left sides of the goods-carrying body 11 via supplying friction surfaces such as boring holes 140 therethrough.

Figure 7:
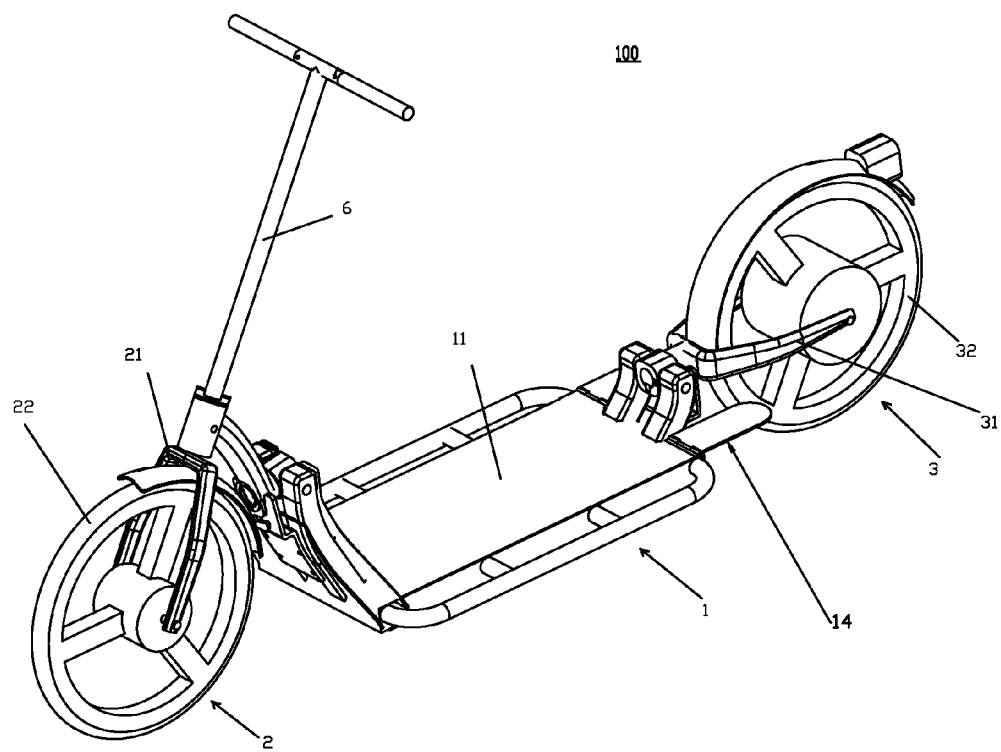
FIG. 7 is a perspective view of a foldable scooter in accordance with a third embodiment of the present invention.

Referring to FIG. 7, the scooter 100 in accordance the third embodiment of the present invention has two foot pedals 14 foldably extends rearwards from the rear end 18 of the supporting board 1.

Descriptions and applications of the present invention herein are intended to be illustrative, not intended to limit the scope of the present invention to the above described embodiment. Variations and modifications of the embodiment disclosed herein are possible, and for those of ordinary skilled in the field, alternatives and equivalents of various components of the embodiment disclosed herein are common senses and well known. Where any person skilled in this art should know that the present invention can be achieved in other forms, structures, arrangements, proportions, and with other components, materials, and parts, the changes or improvements are still covered within the inventive spirit of the present invention and the scope as defined in the following claims. Without departing from the spirit and scope of the present invention, other modifications and changes of the embodiment disclosed herein can be made and still be covered by the claimed scope of the following claims.

What is claimed is:

1. A foldable scooter, comprising:
a supporting base with a top surface and an opposite back, being capable of carrying goods on the top surface;
a front wheel assembly hinged to a front end of the supporting base via a front rotation assembly, comprising a front fork and a front wheel pivoted to the front fork;
a rear wheel assembly provided hinged to a rear end of the supporting base via a rear rotation assembly, and comprising a rear fork and a rear wheel pivoted to the rear fork;
a steering bar located at a top end of the front wheel assembly; and
a handlebar fixed at a top end of the steering bar;
wherein the foldable scooter further comprises a front rotation assembly and a rear rotation assembly; the front wheel assembly is capable of rotating and then flipping backwards to be folded onto the top surface of the supporting base in a minimum dimension via the front rotation assembly; and the rear wheel assembly is capable of rotating and then flipping forwards to be folded onto the top surface of the supporting base in a minimum dimension via the rear rotation assembly.

2. The foldable scooter as claimed in claim 1, wherein the front rotation assembly comprises a front hinge mechanism with a front hinge and a front connecting mechanism with a front shaft; the front wheel assembly is capable of rotation about the front shaft proximately from a vertical position to a horizontal position relative to the supporting base; and the front wheel assembly is further capable of flipping backwards about the front hinge for folding the front wheel assembly onto the supporting base and flipping reverse for unfolding the same.

3. The foldable scooter as claimed in claim 2, wherein the front hinge is vertical to the front shaft; the front hinge is parallel to the top surface of the supporting base; the front shaft is parallel to the top surface of the supporting base; and the front hinge is inserted through the front shaft.

4. The foldable scooter as claimed in claim 2, wherein the front hinge mechanism further comprises a front seat extending upwards from the front end of the supporting base; the front hinge is rotatably inserted through the front seat and/or is rotatably inserted through the front connecting mechanism; the front hinge together with the front wheel assembly via the front connecting mechanism is rotatable relative to the front seat, and/or the front wheel assembly via the front connecting mechanism is rotatable about the front hinge.

5. The foldable scooter as claimed in claim 4, wherein the front connecting mechanism further comprises a front first sleeve and a connecting structure for connecting the front wheel assembly to the front hinge mechanism; the connecting structure comprises a front second sleeve; both the front first sleeve and the front second sleeve are parallel and respectively fitted on the front shaft; the front second sleeve is rotatable about the front shaft.

6. The foldable scooter as claimed in claim 5, wherein the connecting structure further comprises a head tube and a connecting base connected between the head tube and the second sleeve; the head tube is sleeved on the front fork; the front second sleeve is proximately horizontal; the head tube is proximately upright and aligned to the steering bar; the connecting structure is integral and inseparable.

7. The foldable scooter as claimed in claim 6, wherein the front fork comprises two branches and a main stem; the main stem is inserted in the head tube and with a top end of the main stem connected with a bottom end of the steering bar.

8. The foldable scooter as claimed in claim 1, wherein the steering bar is foldable downwards to the front wheel assembly via a loose-leaf hinge of both hinged leaves with one leaf attached to a bottom end of the steering bar and the other leaf of the loose-leaf hinge attached to a top end of the front fork.

9. The foldable scooter as claimed in claim 5, wherein a locking mechanism is provided to lock and support the front connecting mechanism on the supporting base, and comprises an supporting plate extending upwards from the front end of the supporting base, a pair of rods perpendicularly and respectively extending from a front and a rear plate surfaces of the supporting plate, and a pair of grips formed on the front second sleeve; the supporting plate forms an arc-shaped top end for receiving the front second sleeve; the pair of grips downwards extends from the outer surface of the front second sleeve, is able to grip the rod for locking the front connecting mechanism, and able to release the rod for folding the front wheel assembly.

10. The foldable scooter as claimed in claim 1, wherein the supporting base comprises a goods-carrying body for carry goods and a left and a right foot pedals for carrying a user; at least one rechargeable battery is provided in the supporting base to supply an electric power to drive the scooter to move; a pair of truckles and a drawbar are provided to the scooter for the user to drag the scooter to roll on the ground.

11. The foldable scooter as claimed in claim 1, wherein the rear rotation assembly comprises a rear hinge mechanism with a rear hinge and a rear connecting mechanism with a rear shaft; the rear wheel assembly is capable of rotation about the rear shaft proximately from a vertical position to a horizontal position relative to the supporting base; and the rear wheel assembly is further capable of flipping forwards about the rear hinge for folding the rear wheel assembly onto the supporting base and flipping reverse for unfolding the same.

12. The foldable scooter as claimed in claim 11, wherein the rear hinge is vertical to the rear shaft; the rear hinge is parallel to the top surface of the supporting base; the rear shaft is parallel to the top surface of the supporting base; and the rear hinge is inserted through the rear shaft.

13. The foldable scooter as claimed in claim 11, wherein the rear hinge mechanism further comprises a rear seat extending upwards from the rear end of the supporting base; the rear hinge is rotatably inserted through the rear seat and/or is rotatably inserted through the rear connecting mechanism; the rear hinge together with the rear wheel assembly via the rear connecting mechanism is rotatable relative to the rear seat, and/or the rear wheel assembly via the rear connecting mechanism is rotatable about the rear hinge.

14. The foldable scooter as claimed in claim 11, wherein the rear connecting mechanism further comprises a rear first sleeve and a rear second sleeve; both the rear first sleeve and the rear second sleeve are parallel and respectively fitted on the rear shaft; the rear second sleeve is rotatable about the rear shaft.

15. The foldable scooter as claimed in claim 14, wherein the rear fork comprises two branches and a main stem; the main stem of the rear fork is configured as the rear second sleeve.

16. The foldable scooter as claimed in claim 5, wherein a locking mechanism is provided to lock and support the rear connecting mechanism on the supporting base, and comprises an supporting plate extending upwards from the rear end of the supporting base, a rod perpendicularly and respectively extending from a front and rear plate surfaces of the supporting plate, and a pair of grips formed on the rear second sleeve; the supporting plate forms an arc-shaped top end for receiving the rear second sleeve; the pair of grips downwards extends from the outer surface of the rear second sleeve, is able to grip the rod for locking the rear connecting mechanism, and able to release the rod for folding the rear wheel assembly.

17. The foldable scooter as claimed in claim 1, wherein the handle bar comprises a main rod and two hand grips hinged at both opposite ends of the main rod; the hand grips are able to be folded downwards to parallel to the steering bar; each hand grip forms a tongue-shaped end, and each end of the main rod forms a longitudinal notch with top and bottom sides open for receiving the tongue-shaped end of the hand grip.

18. A method of folding a foldable scooter, comprising:
folding downwards both hand grips from a main rod until the hand grips parallel to a steering bar;
folding the steering bar back and downwards to a front wheel assembly via a loose-leaf hinge until the steering bar parallels to a front wheel;
rotating about 90 degrees clockwise or anticlockwise the front wheel assembly round a front shaft until the front wheel assembly approximately parallels to a supporting base;
flipping backwards the front wheel assembly via a front hinge until the front wheel assembly is received on the supporting base with one radial face of the front wheel facing a top surface of the base;
rotating a rear wheel assembly around a rear shaft until radial faces of the rear wheel are substantially horizontal or parallel to the supporting base; and
flipping forwards the rear wheel assembly via a rear hinge until the rear wheel assembly is received on the supporting base with one radial face of a rear wheel facing the top surface of the base;
whereby the scooter is folded to a minimum dimension for being dragged or placed.

* * * * *